United States Patent
Ino

(10) Patent No.: US 9,488,380 B2
(45) Date of Patent: Nov. 8, 2016

(54) AIR-CONDITIONING REMOTE CONTROLLER

(75) Inventor: Masaoki Ino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 332 days.

(21) Appl. No.: 14/240,429

(22) PCT Filed: Dec. 20, 2011

(86) PCT No.: PCT/JP2011/007093
§ 371 (c)(1),
(2), (4) Date: Feb. 24, 2014

(87) PCT Pub. No.: WO2013/093959
PCT Pub. Date: Jun. 27, 2013

(65) Prior Publication Data
US 2014/0175182 A1    Jun. 26, 2014

(51) Int. Cl.
| F24F 11/00 | (2006.01) |
| G05D 23/19 | (2006.01) |
| G08C 17/02 | (2006.01) |
| B60H 1/00 | (2006.01) |
| G01K 1/14 | (2006.01) |

(52) U.S. Cl.
CPC ....... F24F 11/0086 (2013.01); B60H 1/00657 (2013.01); G01K 1/14 (2013.01); G05D 23/1905 (2013.01); G08C 17/02 (2013.01); F24F 2011/0068 (2013.01); G01K 2201/00 (2013.01)

(58) Field of Classification Search
CPC ............. F24F 11/0012; F24F 11/0086; F24F 2011/0068; B60H 1/00657; G01K 1/14; G01K 2201/00; G05D 23/1905; G08C 17/02
See application file for complete search history.

(56) References Cited

U.S. PATENT DOCUMENTS

| 6,213,404 B1 | 4/2001 | Dushane et al. |
| 2002/0124584 A1* | 9/2002 | Sumida ............... F24F 11/0012 62/202 |
| 2015/0354848 A1* | 12/2015 | Abel ................... F24F 11/0012 236/1 C |

FOREIGN PATENT DOCUMENTS

| CN | 101297183 A | 10/2008 |
| JP | S63-143601 A | 6/1988 |
| JP | H05-87445 U | 11/1993 |
| JP | H06-257820 A | 9/1994 |

(Continued)

OTHER PUBLICATIONS

Extended European Search Report dated Jul. 3, 2015 issued in corresponding EP patent application No. 11877961.0.

(Continued)

Primary Examiner — Marc Norman
(74) Attorney, Agent, or Firm — Posz Law Group, PLC

(57) ABSTRACT

A printed board arranged within an upper case and having a hole, a partition portion arranged within the upper case so as to be substantially orthogonal to the printed board and provided with a cut, and a temperature sensor arranged within the upper case and having a covered wire, a soldered portion provided at an end of the covered wire, and a temperature detection portion provided at another end of the covered wire, are provided. The temperature sensor is fixed such that the soldered portion is soldered to a surface of the printed board, the covered wire is inserted through the hole and engaged with the cut to be fixed, and the temperature detection portion is located near an inner surface of the upper case.

10 Claims, 8 Drawing Sheets

(56) References Cited

FOREIGN PATENT DOCUMENTS

| | | |
|---|---|---|
| JP | H07-42911 U | 8/1995 |
| JP | 2001-050795 A | 2/2001 |
| JP | 2001-160660 A | 6/2001 |
| JP | 2001-221486 A | 8/2001 |
| JP | 2002-111140 A | 4/2002 |
| JP | 2004-293801 A | 10/2004 |
| JP | 2007-120963 A | 5/2007 |
| JP | 2008-014525 A | 1/2008 |

OTHER PUBLICATIONS

Office Action issued Dec. 22, 2015 in the corresponding CN application No. 201180073966.2 (with English ranslation).

International Search Report of the International Searching Authority mailed Mar. 19, 2012 for the corresponding international application No. PCT/JP2011/007093.

Office Action mailed Mar. 31, 2015 in the corresponding JP application No. 2013-549943 (and English translation).

Office Action dated Aug. 10, 2016 issued in corresponding CN patent application No. 201180073966.2 (and English translation).

* cited by examiner

F I G. 1
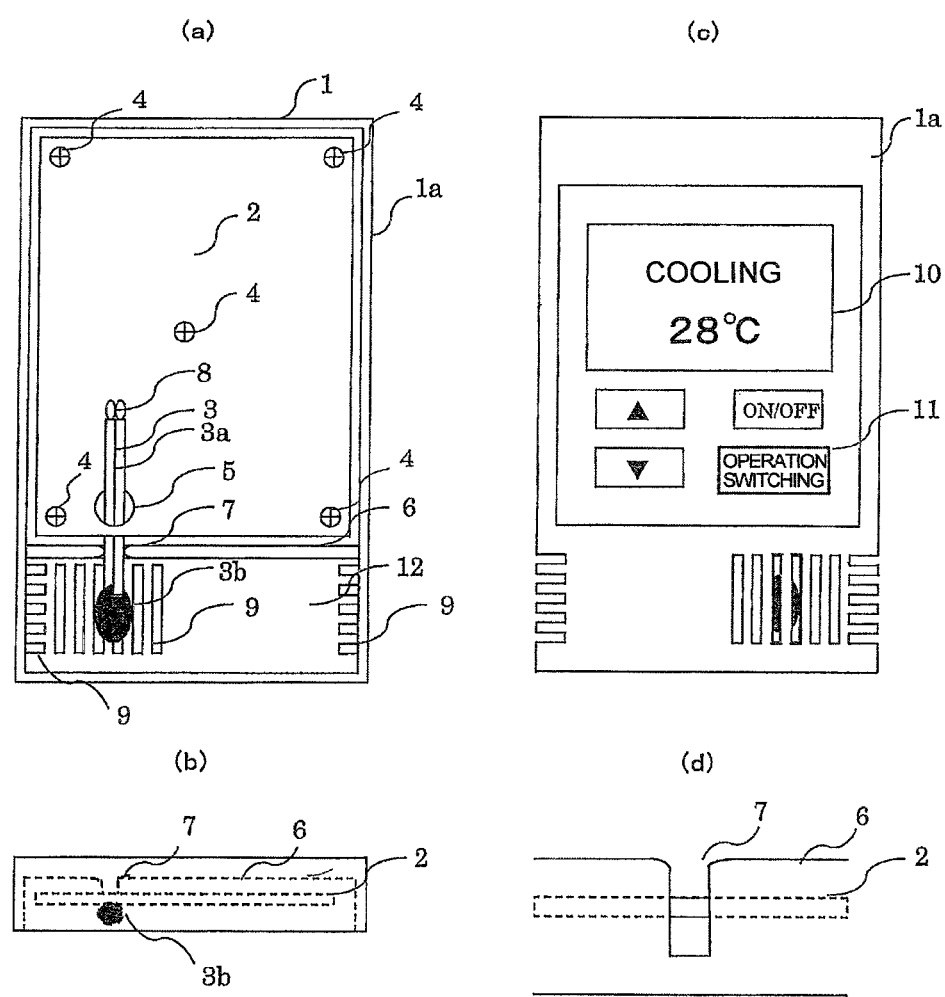

(a)

(b)

(a)

(b)

(a)

(b)

(a)

(b)

AIR-CONDITIONING REMOTE CONTROLLER

CROSS REFERENCE TO RELATED APPLICATION

This application is a U.S. national stage application of International Application No. PCT/JP2011/007093 filed on Dec. 20, 2011, the disclosure of which is incorporated by reference.

TECHNICAL FIELD

The present invention relates to an air-conditioning remote controller which is able to detect an atmospheric temperature at an installation location.

BACKGROUND ART

In an existing air-conditioning remote controller, a temperature sensor is provided within a case, and it is possible to detect an atmospheric temperature at an installation location (an air-conditioned space such as a room). For example, the temperature sensor provided in such an air-conditioning remote controller is soldered at its end portion to a solder surface of a printed board, and an intermediate portion thereof (covered wire) is inserted into a cut provided in a partition portion within the case, whereby the temperature sensor is fixed within the case.

In addition, a technology is disclosed in which a hole having a slit leading to an end surface of a printed board is provided in the printed board and a wire soldered to the printed board is passed through the hole, whereby movement of the wire in a longitudinal direction thereof is restricted (e.g., see Patent Literature 1).

CITATION LIST

Patent Literature

Patent Literature 1: Japanese Unexamined Patent Application Publication No. 2002-111140

SUMMARY OF INVENTION

Technical Problem

In the existing air-conditioning remote controller described above, the intermediate portion of the temperature sensor linearly extends to the cut, and thus the degree of insertion of the temperature sensor into the cut (the degree of insertion into a cut groove) is low, and a temperature detection portion at another end portion of the temperature sensor is fixed at a position distant from the atmosphere desired to be measured. In other words, the temperature detection portion is located at the back side of the case front surface and is distant from the atmosphere whose temperature is desired to be measured. Thus, in order to make the temperature detection portion of the temperature sensor close to the atmosphere desired to be measured, an operation of pressing the intermediate portion of the temperature sensor into the cut during manufacture is additionally required. In addition, depending on a force for pressing, the temperature sensor may bend backward with the intermediate portion of the temperature sensor as a fulcrum, and the temperature detection portion may be directed in the direction opposite to the pressing direction.

In addition, manually pressing and moving the temperature detection portion such that the temperature detection portion is located at the front side of the air-conditioning remote controller, is conceivable. However, the process in assembling the air-conditioning remote controller is complicated, and when a shock is applied to the temperature detection portion, the position of the temperature detection portion is changed. Thus, the case where it is difficult to accurately measure the atmospheric temperature is also assumed.

Moreover, when the degree of insertion of the intermediate portion of the temperature sensor into the cut is decreased, the temperature detection portion is fixed at a position distant from a location desired to be measured, and thus the measurement accuracy of the atmospheric temperature is decreased. On the other hand, when the degree of insertion of the intermediate portion of the temperature sensor is increased, the temperature detection portion is brought into contact with the case and is influenced by the temperature of the case, and thus it is made impossible to accurately measure the atmospheric temperature.

It should be noted that providing the temperature sensor on a component surface of the printed board is conceivable as a method for increasing the degree of insertion of the intermediate portion of the temperature sensor into the cut. However, since operation buttons and switches are arranged on the component surface of the printed board in consideration of design, it is not desirable to change the positions of these buttons and switches and provide the temperature sensor on the component surface of the printed board.

In addition, when a wire fixing method in Patent Literature 1 is applied to fixing the temperature sensor, it is possible to make the temperature detection portion of the temperature sensor to be close to the atmosphere desired to be measured. However, it is impossible to reduce variability of the position of the temperature detection portion of the temperature sensor without a manual operation, and thus, as a result, there is a concern that the accuracy of detecting the atmospheric temperature is decreased.

The present invention has been made in order to solve at least one of the above-described problems, and an object of the present invention is to provide an air-conditioning remote controller in which a temperature detection portion of a temperature sensor is fixed near a position where temperature measurement is performed.

Solution to Problem

An air-conditioning remote controller according to the present invention includes: a case; a printed board arranged within the case and having a hole; a partition portion arranged within the case so as to be substantially orthogonal to the printed board and provided with a cut; and a temperature sensor arranged within the case and having a covered wire, a soldered portion provided at an end of the covered wire, and a temperature detection portion provided at another end of the covered wire. The temperature sensor is fixed such that the soldered portion is soldered to a surface of the printed board, the covered wire is inserted through the hole and engaged with the cut to be fixed, and the temperature detection portion is located near an inner surface of the case.

Advantageous Effects of Invention

According to the air-conditioning remote controller according to the present invention, the temperature detection portion is stably fixed near an atmosphere to be measured. Thus, it is not necessary to adjust the fixed position of the temperature detection portion of the temperature sensor through a manual operation or the like during manufacture, and variability of the fixed position of the temperature detection portion is reduced. In addition, the temperature detection portion is fixed without coming in contact with an upper case. As a result, it is possible to suppress decrease in the temperature detection accuracy of the temperature sensor.

BRIEF DESCRIPTION OF DRAWINGS

FIG. 1 is a schematic diagram showing an air-conditioning remote controller according to Embodiment 1 of the present invention.

DESCRIPTION OF EMBODIMENTS

Embodiment 1

FIG. 1 is a schematic diagram showing an air-conditioning remote controller 1 according to Embodiment 1 of the present invention. FIG. 1(a) is a schematic perspective view showing an internal state when the air-conditioning remote controller 1 is seen from its back. FIG. 1(b) is a perspective view when the air-conditioning remote controller 1 is seen from its bottom. FIG. 1(c) is a schematic diagram showing a state when the air-conditioning remote controller 1 is seen from tis front. FIG. 1(d) is a partially enlarged diagram of an inside showing a portion of a cut 7 in a partition portion 6.

Figure 2:
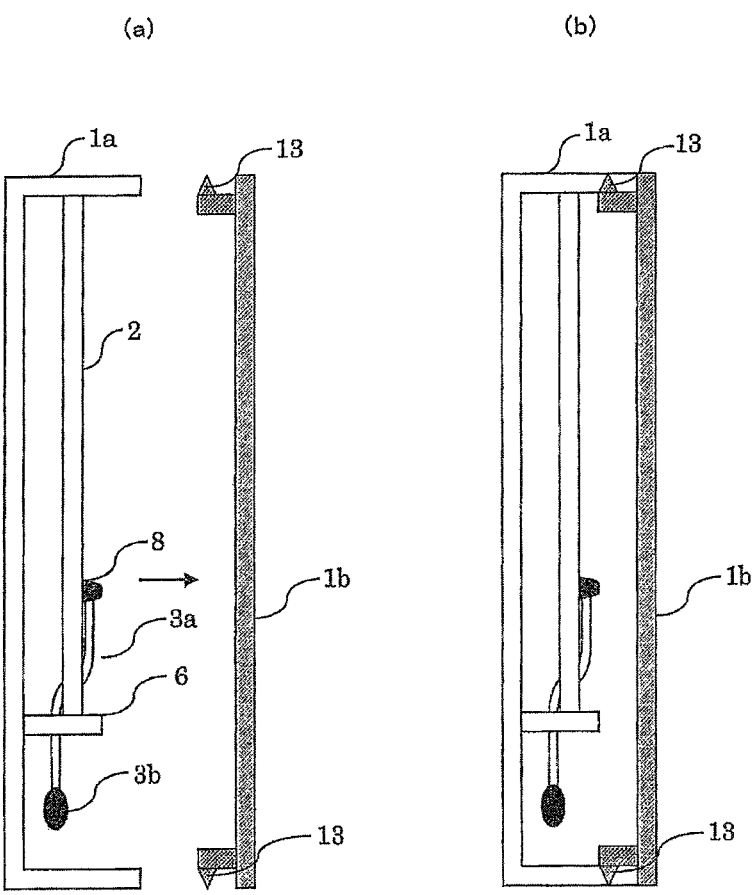
FIG. 2 is a schematic longitudinal cross-sectional view showing upper and lower cases of the air-conditioning remote controller according to Embodiment 1 of the present invention.

FIG. 2 is a schematic longitudinal cross-sectional view showing upper and lower cases of the air-conditioning remote controller 1 according to Embodiment 1 of the present invention. FIG. 2(a) shows a state where the upper case 1a and the lower case 1b of the air-conditioning remote controller 1 according to Embodiment 1 of the present invention are separated from each other, and FIG. 2(b) shows a state where the upper case 1a and the lower case 1b of the air-conditioning remote controller 1 according to Embodiment 1 of the present invention are fitted to each other.

Hereinafter, the structure of the air-conditioning remote controller 1 will be described with reference to FIGS. 1(a) to 1(d), 2(a), and 2(b).

The air-conditioning remote controller 1 is connected to an air-conditioning apparatus via a communication line, and is installed on a wall or the like in an air-conditioned space for selecting and setting a function of the air-conditioning apparatus. The air-conditioning remote controller 1 transmits detected temperature information, information regarding switching of cooling and heating operation instructed from a user, temperature information set by the user, and the like to the main body side (air-conditioning apparatus). Then, the air-conditioning apparatus operates on the basis of the transmitted information. The air-conditioning remote controller 1 includes the upper case 1a, the lower case 1b, a printed board 2, a temperature sensor 3, and the partition portion 6.

The upper case 1a constitutes a front portion, a left side portion, a right side portion, a top portion, and a bottom portion of a casing of the air-conditioning remote controller 1, and has ventilation slits 9, a liquid crystal display portion 10, and an operation portion 11. The lower case 1b constitutes a back portion of the casing of the air-conditioning remote controller 1, and has claws 13.

Components (not shown) such as a microcomputer and a liquid crystal display are mounted on the printed board 2 by means of soldering. An upper end portion of the printed board 2 and a lower end portion of the printed board 2 are fixed to the upper case 1a via screws 4 or the like. In addition, a hole 5 is formed in a portion of the printed board 2.

The temperature sensor 3 detects an atmospheric temperature at a location where the air-conditioning remote controller 1 is installed, and is provided in the air-conditioning remote controller 1. The temperature sensor 3 has a covered wire 3a which is an intermediate portion, a soldered portion 8 provided at an end of the covered wire 3a, and a temperature detection portion 3b provided at another end of the covered wire 3a. The covered wire 3a is covered with an insulating vinyl. The temperature detection portion 3b is located in a room temperature detection portion 12 and detects an atmospheric temperature. The soldered portion 8 is a portion which is soldered and fixed to a surface of the printed board 2 which faces the back portion of the air-conditioning remote controller 1. The temperature sensor 3 is electrically connected to the printed board 2 via the soldered portion 8. The temperature detection portion 3b is inserted through the hole 5 formed in the portion of the printed board 2. It should be noted that the size of the hole 5 may be large enough to allow the temperature detection portion 3b to pass therethrough.

The partition portion 6 is provided within the upper case 1a in order to prevent foreign matter from entering from the room temperature detection portion 12 (described later) to the printed board 2. The cut 7 for fixing the covered wire 3a of the temperature sensor 3 is provided in the partition portion 6 as shown in FIG. 1(d).

The ventilation slits 9 ensure a ventilation characteristic between the inside and the outside of the air-conditioning remote controller 1. The liquid crystal display portion 10 displays an operating state of the air-conditioning apparatus, a set temperature, and the like, and, for example, a liquid crystal display or the like is generally used. The operation portion 11 is used for operating the operating state of the air-conditioning apparatus or the set temperature, and is composed of switches, buttons, and the like.

It should be noted that a hole is provided in a portion of the upper case 1a (the liquid crystal display portion 10). Thus, when the printed board 2 is fixed to the upper case 1a, the user is allowed to view the liquid crystal display provided in the printed board 2, through the hole of the upper case 1a. It should be noted that in general, a transparent seal (not shown) is attached so as to cover the liquid crystal display portion 10 and the operation portion 11 of the upper case 1a. For example, characters and figures indicating ON/OFF of operation, switching of cooling and heating operations, or the like are drawn on the seal. The seal is attached such that the characters and the like which are drawn on the seal and indicate functions are located at positions, above the switches and the buttons of the operation portion 11, corresponding to the functions.

Since the seal is attached to the upper case 1a, the functions of the switches and the buttons of the operation portion 11 are clearly distinguished. In addition, it is possible to restrain dust and the like from entering to the printed board 2 through the hole provided in the upper case 1a. In addition, it is possible to improve the design of the upper case 1a.

As shown in FIG. 2(a), the claws 13 are provided at an upper portion and a lower portion of the lower case 1b. A projection is provided at the claw 13 provided at the upper portion of the lower case 1b and projects upward. A projection is provided at the claw 13 provided at the lower portion of the lower case 1b and projects downward. When these claws 13 are inserted into receiving portions (not shown) of the upper case 1a, the upper case 1a and the lower case 1b are fitted to each other as shown in FIG. 2(b).

The room temperature detection portion 12 is a space which is formed by the partition portion 6 when the upper case 1a and the lower case 1b are fitted to each other. The temperature in the room temperature detection portion 12 is measured by the temperature detection portion 3b.

It should be noted that as shown in FIG. 1(a), the covered wire 3a, the temperature detection portion 3b, the hole 5, the cut 7, and the soldered portion 8 are arranged linearly, and the direction in which the covered wire 3a is inserted into the cut 7 is a direction perpendicular to the partition portion 6. In addition, it is preferred that the distance between an end surface of the partition portion 6 (a surface at the printed board 2 side) and an end surface of the printed board 2 (a surface at the partition portion 6 side) is smaller.

In addition, as shown in FIG. 1(b), in order to avoid disturbance other than the atmospheric temperature, the temperature detection portion 3b is fixed in the space of the room temperature detection portion 12 without being in contact with any portion of the upper case 1a.

In addition, as shown in FIG. 1(d), the depth of the cut 7 is made smaller than the height of the partition portion 6 by about the diameter of the temperature detection portion 3b such that the temperature detection portion 3b is not in contact with the upper case 1a. Moreover, the width of the cut 7 is designed to be smaller than the width of the covered wire 3a. Furthermore, the height of the position at which the printed board 2 is fixed falls within the range of the depth of the cut 7.

Figure 3:
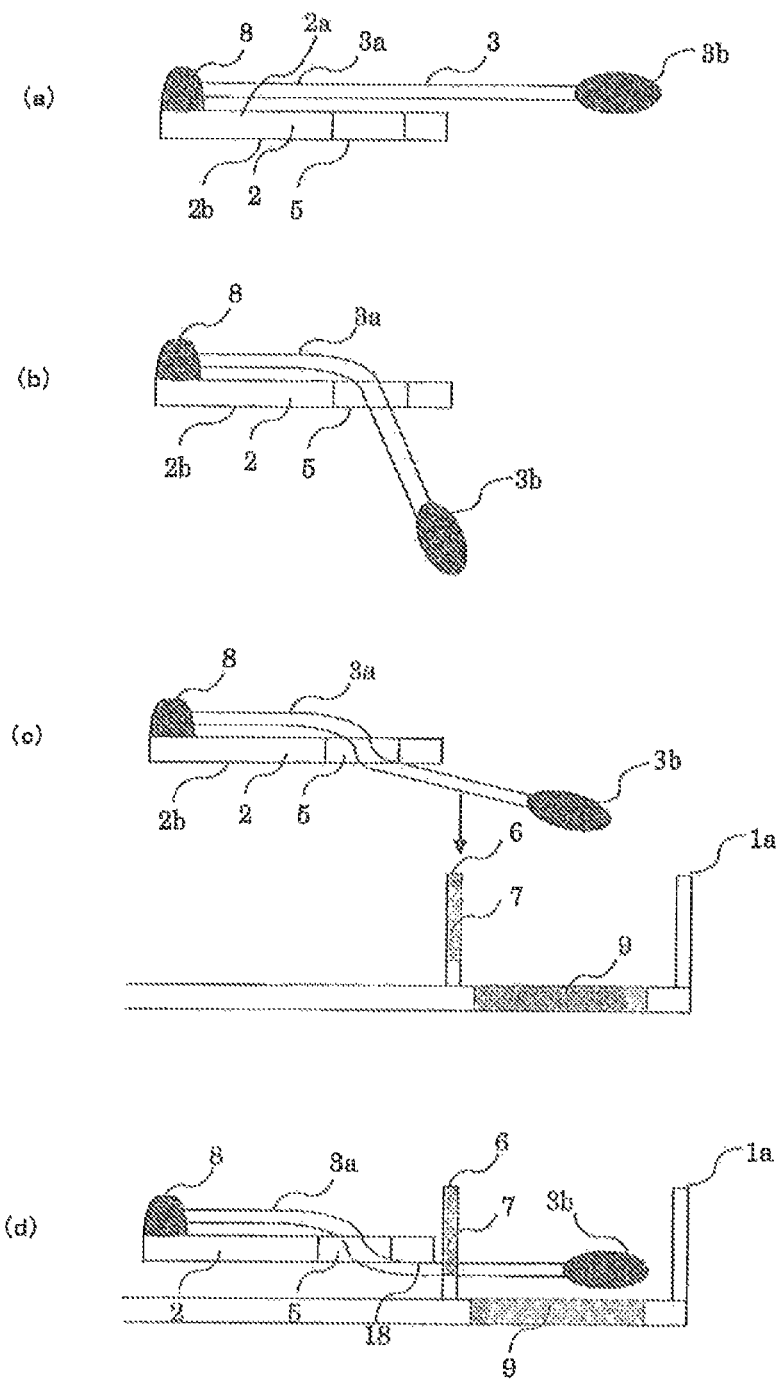
FIG. 3 is a schematic diagram showing a method for fixing a temperature sensor according to Embodiment 1 of the present invention.

FIG. 3 is a schematic diagram showing a method for fixing the temperature sensor 3. FIG. 3(a) is a diagram showing a state where the temperature sensor 3 is soldered to the printed board 2, FIG. 3(b) is a diagram showing a state where the temperature detection portion 3b of the temperature sensor 3 is passed through the hole 5 of the printed board 2, FIG. 3(c) is a diagram showing a state before fixing the printed board 2 and the temperature sensor 3 to the upper case 1a, and FIG. 3(d) is a diagram showing a state where the printed board 2 and the temperature sensor 3 are fixed to the upper case 1a.

Hereinafter, a method for fixing the printed board 2 to the upper case 1a will be described with reference to FIGS. 3(a) to 3(d).

First, as shown in FIG. 3(a), the soldered portion 8 of the temperature sensor 3 is soldered to a solder surface 2a of the printed board 2 to be electrically connected thereto.

Next, as shown in FIG. 3(b), the temperature detection portion 3b is passed through the hole 5 provided in the printed board 2 and is protruded from a component surface 2b.

Next, as shown in FIG. 3(c), the covered wire 3a protruded at the component surface 2b side is adjusted so as to be horizontal with the printed board 2. At that time, it is not necessary to make adjustment to be completely horizontal, and the angle between the covered wire 3a and the printed board 2 may be equal to or less than about 30 degrees.

Next, when the printed board 2 is fitted into the upper case 1a while the position of the covered wire 3a and the position of the cut 7 coincide with each other as shown in FIG. 3(d), the temperature detection portion 3b is fixed at a position near the ventilation slits 9 of the upper case 1a. It should be noted that the printed board 2 is fixed to the upper case 1a via screws 4, and thus the present invention is not limited to fitting-in.

It should be noted that a contact surface 18 is a surface on which the covered wire 3a is in contact with the printed board 2. When the printed board 2 is fitted into the upper case 1a, the contact surface 18 serves to press the covered wire 3a to insert the covered wire 3a into the cut 7. Since the width of the cut 7 is designed to be smaller than the width of the covered wire 3a, appropriate frictional resistance acts when the covered wire 3a is inserted into the cut 7. Thus, even when there is an angle between the covered wire 3a and the printed board 2 as in FIG. 3(c), the temperature detection portion 3b is prevented from coming into contact with the ventilation slit 9 portion of the upper case 1a by raising the covered wire 3a.

It should be noted that after the soldered portion 8 of the temperature sensor 3 is soldered to the solder surface 2a of the printed board 2, the temperature detection portion 3b is passed through the hole 5 provided in the printed board 2 and is protruded from the component surface 2b, but the present invention is not limited to this. For example, after the temperature detection portion 3b is passed through the hole 5 provided in the printed board 2 and is protruded from the component surface 2b, the soldered portion 8 may be soldered to the solder surface 2a.

Figure 8:
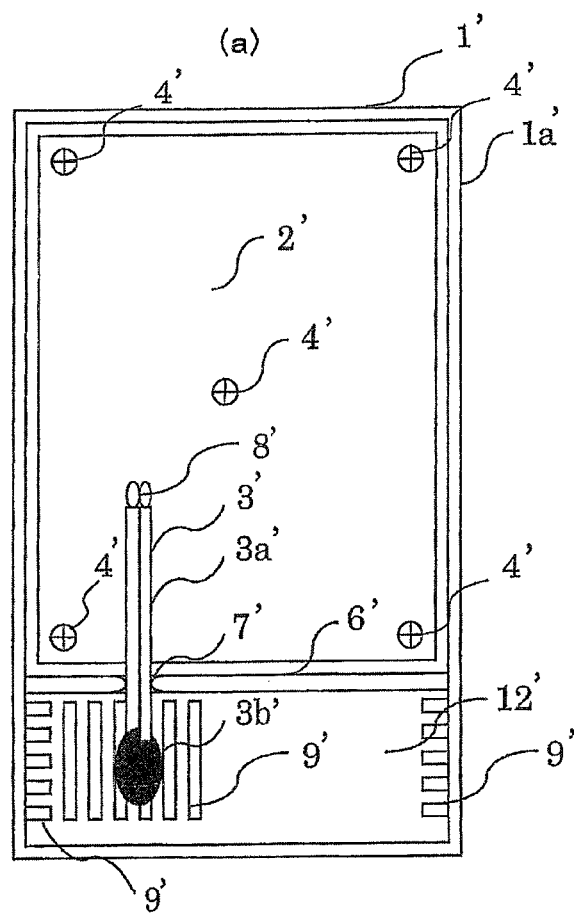
FIG. 8 is a schematic diagram showing an air-conditioning remote controller in a related art example.
Figure 8:
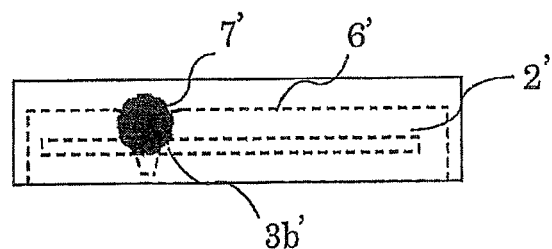
Figure 9:
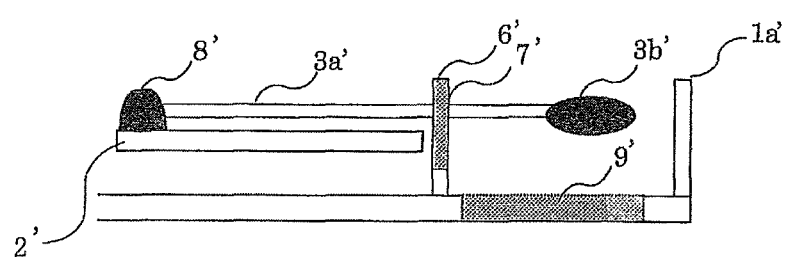
FIG. 9 is a longitudinal side view showing a fixed state of a temperature sensor in the related art example.
Figure 9:
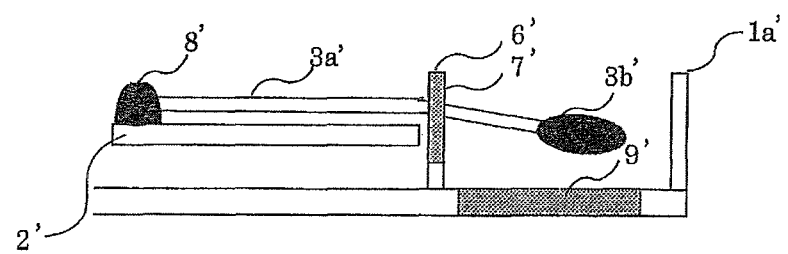

FIGS. 8 and 9 show an existing air-conditioning remote controller 1'. In the air-conditioning remote controller 1' in FIGS. 8 and 9, when it is desired to make a temperature detection portion 3b' at another end portion of a temperature sensor 3' to be close to an atmosphere desired to be measured, an operation of pressing a covered wire 3a' of the temperature sensor 3' into a cut 7' is required during manufacture. In addition, depending on a force for pressing, the temperature detection portion 3b' may bend backward with an intermediate portion of the temperature sensor 3' as a fulcrum, and the temperature detection portion 3b' may be directed in the direction opposite to the pressing direction. It should be noted that for descriptive purposes, "'" is added to the reference characters for the parts of the existing one to facilitate comparison.

In addition, as shown in FIG. 9(b), when the temperature detection portion 3b' is manually pressed and moved such that the temperature detection portion 3b' is located at the front side of the air-conditioning remote controller 1', the process in assembling the air-conditioning remote controller 1' is complicated, and when a shock is applied to the temperature detection portion 3b', the position of the temperature detection portion 3b' is changed. Thus, the case where it is difficult to accurately measure the atmospheric temperature is also assumed.

In addition, when the degree of insertion of the covered wire 3a' into the cut 7' is decreased, the measurement accuracy of the atmospheric temperature is decreased, and when the degree of insertion of the covered wire 3a' into the cut 7' is increased, the temperature detection portion 3b' comes into contact with the upper case 1a' and is influenced by the temperature of the upper case 1a'. Thus, it is made impossible to accurately measure the atmospheric temperature.

Figure 7:
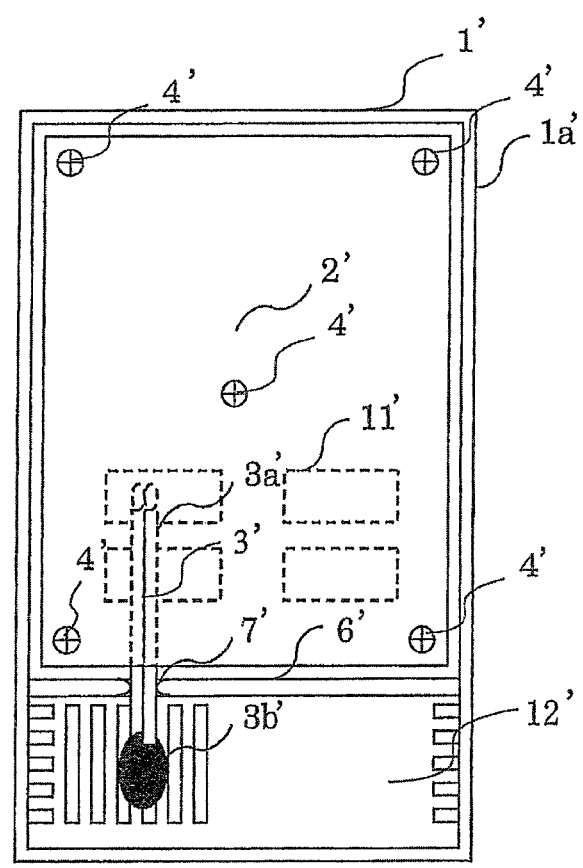
FIG. 7 is a schematic diagram showing a structure example of an air-conditioning remote controller in which it is difficult to mount a temperature sensor equipped with a covered wire.

It should be noted that providing the temperature sensor 3' on the component surface of a printed board 2' (a surface which faces a front portion of the air-conditioning remote controller 1') and increasing the degree of insertion of the covered wire 3a' into the cut 7' as in FIG. 7 is conceived. However, it is not desirable to change the positions of operation buttons and switches arranged on the component surface of the printed board 2' and provide the temperature sensor 3' on the component surface of the printed board 2'.

In contrast, according to the air-conditioning remote controller 1 according to Embodiment 1 of the present invention, the temperature detection portion 3b is stably fixed near the atmosphere to be measured. Thus, there is no need to manually adjust the fixed position of the temperature detection portion 3b during manufacture, and variability of the fixed position of the temperature detection portion 3b is reduced. In addition, the temperature detection portion 3b is fixed without being in contact with the upper case 1a. As a result, it is possible to suppress decrease of the temperature detection accuracy of the temperature sensor 3.

It should be noted that the upper case 1a and the lower case 1b are configured to be fitted to each other in Embodiment 1, but the upper case 1a and the lower case 1b may be fixed to each other by means of screws. In addition, a case in which the upper case 1a and the lower case 1b are not separate from each other and are integrated with each other may be used.

Embodiment 2

Figure 4:
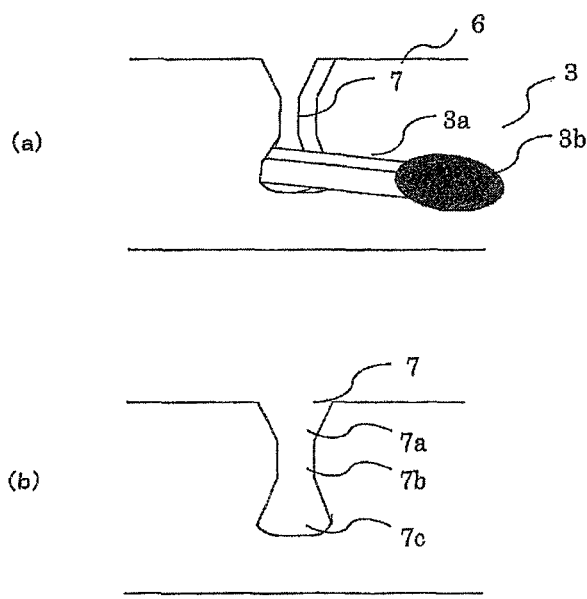
FIG. 4 is a schematic diagram showing a cut in a partition portion according to Embodiment 2 of the present invention.

FIG. 4 is a schematic diagram showing the cut 7 portion of the partition portion 6. FIG. 4(a) shows a state where the temperature sensor 3 is inserted into the cut 7 and fixed, and FIG. 4(b) shows the shape of the cut 7 formed in a keyhole shape.

Hereinafter, an operation of inserting the temperature sensor 3 into the cut 7 will be described with reference to FIGS. 4(a) and 4(b). It should be noted that in Embodiment 2, the difference from Embodiment 1 will be mainly described, the same portions as those in Embodiment 1 are designated by the same reference characters, and the description thereof is omitted.

The cut 7 is provided with an upper portion 7a, a center portion 7b, and a lower portion 7c. Regarding the shape of the cut 7, the width of each of the upper portion 7a and the lower portion 7c is about twice that of the covered wire 3a such that the covered wire 3a is easily inserted thereinto, and the width of the center portion 7b is equal to or less than that of the covered wire 3a.

As the temperature sensor 3 is inserted into the upper case 1a similarly to Embodiment 1, the contact surface 18 presses the covered wire 3a down as shown in FIG. 3(d), and the covered wire 3a is appropriately raised with receiving resistance caused by friction against the cut 7 at the same time when the covered wire 3a passes through the center portion 7b. As a result, the covered wire 3a is inserted into the lower portion 7c of the cut 7 without the temperature detection portion 3b coming into contact with the upper case 1a, and fixing of the temperature sensor 3 is completed. It should be noted that the width dimension of the center portion 7b is adjusted such that when the covered wire 3a passes through the center portion 7b whose width is smaller than that of the covered wire 3a, the temperature detection portion 3b is not excessively raised.

As described above, according to the air-conditioning remote controller 1 according to Embodiment 2 of the present invention, since the shape of the cut 7 is a keyhole shape, when the printed board 2 is inserted into the upper case 1a, the covered wire 3a is initially easily passed through the upper portion 7a of the cut 7, and the covered wire 3a is raised when passing through the center portion 7b. Thus, it is possible to fix the temperature sensor 3 at a stable position only with an operation of fixing the printed board 2 to the upper case 1a, and an operation of fixing the temperature sensor 3 through a manual operation or the like is not required.

In addition, according to the air-conditioning remote controller 1 according to Embodiment 2 of the present invention, once the temperature sensor 3 is fixed, since the center portion 7b of the cut 7 is structured to be narrower than the covered wire 3a, the fixed position of the temperature sensor is unlikely to change due to vibrations or the like, and it is possible to suppress decrease in temperature detection accuracy due to the fixed position of the temperature sensor.

Figure 5:
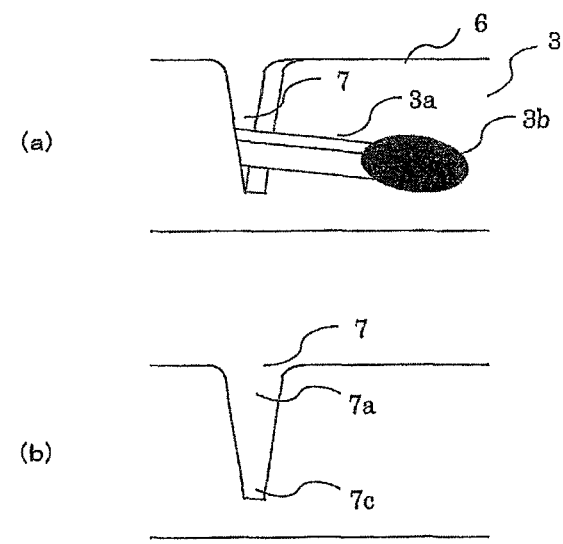
FIG. 5 is a schematic diagram showing the cut in the partition portion according to Embodiment 2 of the present invention and is a modified example of FIG. 4.

FIG. 5 is a schematic diagram showing the cut 7 portion of the partition portion 6, and is a modified example of FIG. 4. FIG. 5(a) is a schematic diagram showing a state where the temperature sensor 3 is inserted into the cut 7 and fixed. FIG. 5(b) is a schematic diagram showing the shape of the cut 7 formed in a V shape.

Hereinafter, a method for inserting the temperature sensor 3 into the cut 7 will be described with reference to FIGS. 5(a) and 5(b).

The cut 7 is provided with an upper portion 7a and a lower portion 7c. Regarding the shape of the cut 7, the width of the upper portion 7a is about twice that of the covered wire 3a such that the covered wire 3a is easily inserted thereinto, and the width of the lower portion 7c is equal to or less than the width of the covered wire 3a.

As the temperature sensor 3 is inserted into the upper case 1a similarly to Embodiment 1, the contact surface 18 presses the covered wire 3a down, and the covered wire 3a is appropriately raised with receiving resistance by friction against the cut 7. As a result, the covered wire 3a is inserted into the lower portion 7c of the cut 7 without coming into contact with the upper case 1a, and the temperature sensor 3 is fixed. Since the lower portion 7c of the cut 7 is narrower than the covered wire 3a, the temperature sensor 3 is fixed in a manner of being squeezed by the lower portion 7c.

As described above, according to the air-conditioning remote controller 1 according to Embodiment 2 of the present invention, since the shape of the cut 7 is a V shape, when the printed board 2 is inserted into the upper case 1a, the covered wire 3a easily passes through the upper portion 7a of the cut 7, and further the covered wire 3a is raised by the frictional force applied from the cut 7. Thus, it is possible to fix the temperature sensor 3 at a stable position only with an operation of fixing the printed board 2 to the upper case 1a, and an operation of fixing the temperature sensor 3 through a manual operation or the like is not required.

In addition, according to the air-conditioning remote controller 1 according to Embodiment 2 of the present invention, since the lower portion 7c of the cut 7 is structured to be narrower than the covered wire 3a, after the temperature sensor 3 is fixed, the fixed position of the temperature sensor 3 is unlikely to change due to vibrations or the like, and it is possible to suppress decrease in temperature detection accuracy.

Embodiment 3

Figure 6:
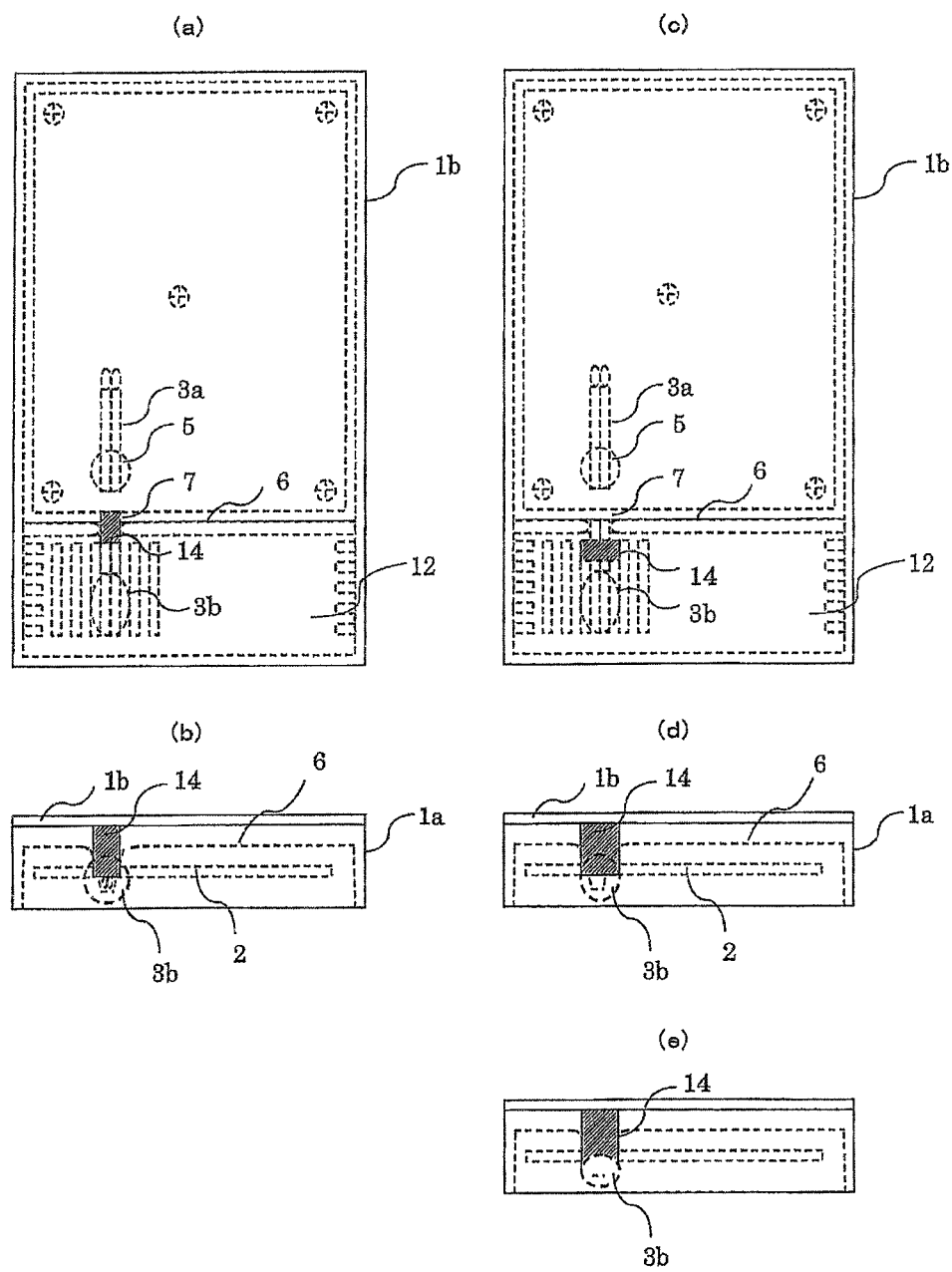
FIG. 6 is a perspective view showing an air-conditioning remote controller according to Embodiment 3 of the present invention.

FIG. 6 is a perspective view showing the air-conditioning remote controller 1. FIG. 6(a) is a perspective view showing an internal state when the air-conditioning remote controller 1 is seen from its back, and FIG. 6(b) is a perspective view showing a state when the air-conditioning remote controller 1 is seen from its bottom. FIG. 6(c) is a perspective view showing an internal state when the air-conditioning remote controller 1 is seen from its back, and is a modified example of FIG. 6(a). FIG. 6(d) is a perspective view when the air-conditioning remote controller 1 is seen from its bottom, and is a modified example of FIG. 6(b). FIG. 6(e) is a perspective view when the air-conditioning remote controller 1 is seen from its bottom, and is a modified example of FIG. 6(d).

Hereinafter, a method for pressing and fixing the covered wire 3a via a projection 14 will be described with reference to FIGS. 6(a) to 6(e). It should be noted that in Embodiment 3, the difference from Embodiment 1 and Embodiment 2 will be mainly described, the same portions as those in Embodiment 1 and Embodiment 2 are designated by the same reference characters, and the description thereof is omitted.

The projection 14 is provided on the lower case 1b and is located at such a position where the covered wire 3a is inserted into the cut 7 when the upper case 1a and the lower case 1b are fitted to each other. As shown in FIGS. 6(a) and 6(b), the covered wire 3a is pressed by the projection 14 and fixed in the cut 7.

As shown in FIG. 6(b), the height dimension of the projection 14 is up to a lower surface of the printed board 2, but the height dimension may be determined such that the temperature detection portion 3b is fixed at a desired position, under a condition where the height dimension is smaller than the depth of the cut 7.

In the structure in which the projection 14 is inserted into the cut 7, the positions and the dimensions of the projection 14 and the cut 7 are needed to be accurate. Thus, as shown in FIGS. 6(c) and 6(d), the covered wire 3a may be pressed by the projection 14 in the room temperature detection portion 12. In this case as well, the covered wire 3a is inserted into the cut 7 similarly to Embodiment 1, and thus the projection 14 serves to press the covered wire 3a even when the projection 14 is structured to have a flat end.

It should be noted that when it is desired to further reduce the variability range or the movable range of the fixed position of the temperature detection portion 3b, the shape of the projection 14 may be an arc shape as in FIG. 6(e) such that the projection 14 comes into close contact with the covered wire 3a. It should be noted that the arc shape is an example, and the shape is appropriately changed in accordance with the shape of the covered wire 3a.

As described above, according to the air-conditioning remote controller 1 according to Embodiment 3 of the present invention, the projection 14 is provided on the lower case 1b, and the covered wire 3a is pressed by the projection 14 when the lower case 1b is fitted to the upper case 1a. Thus, it is possible to fix the temperature sensor 3 at a stable position only with an operation of fitting the lower case 1b to the upper case 1a, and an operation of fixing the temperature sensor 3 through a manual operation or the like is not required.

REFERENCE SIGNS LIST 1, 1' air-conditioning remote controller, 1a, 1a' upper case, 1b, 1b' lower case, 2, 2' printed board, 3, 3' temperature sensor, 3a, 3a' covered wire, 3b, 3b' temperature detection portion, 4, 4' screw, 5, 5' hole, 6, 6' partition portion, 7, 7' cut, 7a upper portion, 7b center portion, 7c lower portion, 8, 8' soldered portion, 9, 9' ventilation slit, 10 liquid crystal display portion, 11 operation portion 12, 12' room temperature detection portion, 13 claw, 14 projection, 18 contact surface, 2a solder surface 2b component surface

The invention claimed is:

1. An air-conditioning remote controller comprising:
   a case;
   a printed board arranged within the case and having a hole;
   a partition portion arranged within the case so as to be substantially orthogonal to the printed board and provided with a cut; and
   a temperature sensor arranged within the case and having a covered wire, a soldered portion provided at an end of the covered wire, and a temperature detection portion provided at another end of the covered wire, wherein
   the temperature sensor is fixed such that the soldered portion is soldered to a surface of the printed board, the covered wire is inserted through the hole and engaged with the cut to be fixed, and the temperature detection portion is located near an inner surface of the case.

2. The air-conditioning remote controller of claim 1, wherein the cut is formed in substantially a V shape in which the cut is narrowed from a distal end of the partition portion toward a base end of the partition portion, or is formed such that the cut is narrowed from the distal end of the partition portion toward the base end of the partition portion and the cut is widened from a predetermined depth.

3. The air-conditioning remote controller of claim 1, wherein the case includes a first case and a second case fitted to the first case,
   wherein the second case is provided with a projection, and
   wherein the projection presses and fixes the covered wire into the cut when the first case and the second case are fitted to each other.

4. The air-conditioning remote controller of claim 1, wherein
   the case includes a first case and a second case fitted to the first case,
   the second case is provided with a projection,
   the projection presses and fixes the covered wire into the cut when the first case and the second case are fitted to each other, and
   the projection is curved so as to come into close contact with the covered wire.

5. The air-conditioning remote controller of claim 1, wherein the cut is formed in substantially a V shape in which the cut is narrowed from a distal end of the partition portion toward a base end of the partition portion, or is formed such that the cut is narrowed from the distal end of the partition portion toward the base end of the partition portion and the cut is widened from a predetermined depth, the case includes a first case and a second case fitted to the first case, the second case is provided with a projection, and the projection presses and fixes the covered wire into the cut when the first case and the second case are fitted to each other.

6. The air-conditioning remote controller of claim 1, wherein the case further comprises a projection fixing the covered wire in position.

7. An air-conditioning remote controller comprising:

a case containing a printed board having a hole, a partition portion having a cut, and a temperature sensor having a covered wire extending through the hole of the printed board and into and through the cut of the partition;

an end of the covered wire provided with a soldered portion and another end of the covered wire provided with a temperature dictation portion;

the partition portion being arranged substantially orthogonal to the printed board within the case, and the covered wire having a width fitting within the cut, and the cut of the partition having at least a narrowed portion with a width smaller than the width of the covered wire and configured to hold the covered wire in position, the cut of the partition includes a narrowed portion having a width smaller than the width of the covered wire, the narrowed portion being configured to hold the covered wire in position, wherein the temperature sensor is fixed to the end of the cover wire having the soldered portion being soldered to a surface of the printed board and by a portion of the covered wire being held by the cut of the partition portion, and the temperature detection portion is located near an inner surface of the case.

8. The air-conditioning remote controller of claim 7, wherein the cut of the partition portion has a substantially V-shape in which the cut is narrowed from a distal end of the partition portion toward a base end of the partition portion.

9. The air-conditioning remote controller of claim 7, wherein the cut of the partition portion is narrowed from a distal end of the partition portion toward a base end of the partition portion and the cut is widened from a predetermined depth.

10. The air-conditioning remote controller of claim 7, wherein the case further comprises a projection fixing the covered wire in position.

* * * * *